United States Patent [19]

Hecker et al.

[11] Patent Number: 4,775,235
[45] Date of Patent: Oct. 4, 1988

[54] OPTICAL SPOT SCANNING SYSTEM FOR USE IN THREE-DIMENSIONAL OBJECT INSPECTION

[75] Inventors: Joel Hecker, Port Jefferson Station; Howard K. Stern, Greenlawn, both of N.Y.

[73] Assignee: Robotic Vision Systems, Inc., Hauppauge, N.Y.

[21] Appl. No.: 946,690

[22] Filed: Dec. 29, 1986

Related U.S. Application Data

[63] Continuation of Ser. No. 618,795, Jun. 8, 1984, abandoned.

[51] Int. Cl.$^4$ .............................................. G01B 11/24
[52] U.S. Cl. .......................................... 356/376; 356/1
[58] Field of Search .................................... 356/1, 376

[56] References Cited

U.S. PATENT DOCUMENTS

| | | | |
|---|---|---|---|
| 4,171,917 | 10/1979 | Pirlet | 356/376 |
| 4,553,844 | 11/1985 | Nakagawa et al. | 356/376 |
| 4,627,734 | 12/1986 | Rioux | 356/1 |

FOREIGN PATENT DOCUMENTS 0193407  11/1983  Japan .................................. 356/376

Primary Examiner—R. A. Rosenberger
Attorney, Agent, or Firm—Robin, Blecker & Daley

[57] ABSTRACT

An optical spot scanning system for use in three dimensional measurement and inspection of an object surface wherein a deflector means is placed in the path of the projection axis of the spot projector to deflect the portion of same between the deflector and the object surface, thereby moving the spot to various positions on the object surface, and wherein the deflector means is also positioned in the path of the optical axis of the system sensing means to deflect the portion of same between the sensing means and the object surface by the same degree as the portion of the projection axis is deflected, thereby ensuring the axes portions which are aligned to be coplanar remain coplanar, and that the image of the spot on the object surface will be properly conveyed to the linear sensor array in the sensing means.

11 Claims, 1 Drawing Sheet

OPTICAL SPOT SCANNING SYSTEM FOR USE IN THREE-DIMENSIONAL OBJECT INSPECTION

This application is a continuation of application Ser. No. 618,795, filed June 8, 1984, now abandoned.

BACKGROUND OF THE INVENTION

This invention relates to inspection systems and, more specifically, to optical spot scanning systems for use in three-dimensional object inspection.

Many three-dimensional inspection systems utilize well known optical triangulation techniques as a basis of operation. In systems of this type, a projector projects a structured light pattern onto the object to be inspected. A television camera or other suitable light sensing device is simultaneously directed at the object and observes the contour or image formed by the intersection or confrontation of the projected light pattern and the object surface. The sensing device then converts the observed image into corresponding electrical signals. By appropriately selecting the angular relationship of the light sensing device and the projector, the three-dimensional relationship of the points on the object surface may be determined from the generated electrical signals.

Once the inspection system is calibrated, the three-dimensional characteristics of the entire surface of any arbitrary object may be determined. In particular, this can be accomplished by moving the object to successive positions in front of the sensor-projector combination, by moving the sensor-projector combination relative to the object or by scanning the projected light pattern over the object in sychronism with a scanning sensor. In each case, at each location of the object relative to the sensor-projector combination, three-dimensional data is collected for that location. This continues until sufficient data is obtained to entirely reproduce the object surface.

In some types of inspection systems, a plane of light is projected onto the object surface and the three-dimensional characteristics of the object are determined along the profile formed by the intersection of the light plane and the object surface. By creating relative motion between the light plane and the object, intersection profiles are generated over the entire surface and result in the desired three-dimensional data. In this system, a planar light pattern is used because it enables the generation of three-dimensional data over an entire profile which may contain a large number of object surface points.

The aforesaid planar technique, however, has certain drawbacks when the surface to be reproduced is specularly reflective. With this type of surface, repeated or multiple reflections from the object surface may produce false profile images. This results in incorrect data generation and, as a consequence, an erroneous three-dimensional reproduction.

One way of avoiding this multiple reflection effect is to project the light as a spot or point instead of a plane. In this case, the intersection or confrontation of the light beam and the object surface results in the illumination of a primary object surface location and possibly one or more reflections. A linear array of light sensing elements can then be used to sense the primary image of the illuminated surface location, since only one data point is usually illuminated in a particular plane passing through the light beam. However, for the linear array to properly sense the image and exclude the extraneous reflections, the array axis (defined as the direction along the array length) and the optical axis of the sensor imaging system must be maintained coplaner with the projection axis of the projector.

Since multiple surface reflections generally result in illuminating surface locations which are not in the plane defined by the line array, the imaging system optical axis and the projection axis, they are not simultaneously imaged on the line array with the object surface points under investigation. The use of a projected point or spot system thus effectively eliminates multiple reflection problems associated with specular surfaces.

As can be appreciated, however, with a single spot projection system data is collected for only one object surface point at a time. Furthermore, to complete the three-dimensional reproduction procedure, relative motion along two axes must be carried out. This results in increased equipment complexity and increased time to generate the reproduction.

One way of overcoming the aforesaid drawbacks of single spot projection systems is to place an optical scanning device, such as a for example, a scanning mirror, in the path of the projected spot and image light path. This mirror scans the spot over the object surface to, in effect, form a plane of light. However, at each position in the scan cycle, the scanning spot illuminates a single object surface point so that the system behaves precisely like the projected spot system for each object surface location. As a result, multiple surface reflection effects do not degrade system performance.

In order for the object points to be properly sensed in a scanned spot projection system, the above-discussed coplanar relationship of the sensor array axis, the imaging system optical axis and the projection axis must be maintained. To realize this the imaging optical axis must also be scanned in a manner which tracks the projection axis.

One technique which could be employed to accomplish this tracking is to use two separately controlled scanning mirrors, one for the projector and one for the sensor-imaging system combination. The use of multiple scanning mirrors, however, requires additional controls for synchronizing the mirror scan angles. This, in turn, increases system complexity, as well as system cost and size and requires extremely critical component alignment. In addition, these alignments must not drift with time or temperature and must be maintained over the life of the system.

It is therefore an object of the present invention to provide a spot scanning system for use in three-dimensional reproduction and inspection which does not suffer from the above disadvantages.

It is a further object of the present invention to provide a system of the aforesaid type in which a coplanar relationship between the projection axis and the imaging system optical axis is maintained for all scan positions in a cost effective manner which minimizes the components to be synchronized and aligned.

SUMMARY OF THE INVENTION

In accordance with the principles of the present invention, the above and other objectives are realized in a system of the above type wherein the projector, the linear sensor array and the imaging system are arranged so that the projection axis, the array axis and the imaging system optical axis are coplanar and wherein an optical deflector is situated in the path of the projection axis to deflect the portion of the axis from the deflector to the object surface, and the deflector is further situated in the path of the imaging system optical axis and adapted to deflect this axis to the same degree as the projection axis is deflected, whereby the coplanar relationship of the projection axis and the optical axis is maintained as the projected spot is moved over the object surface to thereby enable the illuminated object points to be imaged along the linear array axis.

In the embodiment of the invention to be disclosed hereinafter, the deflector is in the form of a flat rotatable mirror, so that equal deflection of the projection axis and the optical axis occurs automatically, thereby resulting in the desired coplanar effect. Moreover, in this embodiment, fixed mirrors are used in conjunction with the rotatable mirror to fold the optical axis and the projection axis so as to maintain the appropriate angular separation required for triangulation.

BRIEF DESCRIPTION OF THE DRAWINGS

The above and other features and aspects of the present invention will become more apparent upon reading the following detailed description in conjunction with the accompanying drawings, in which.

Detailed Description

Figure 1:
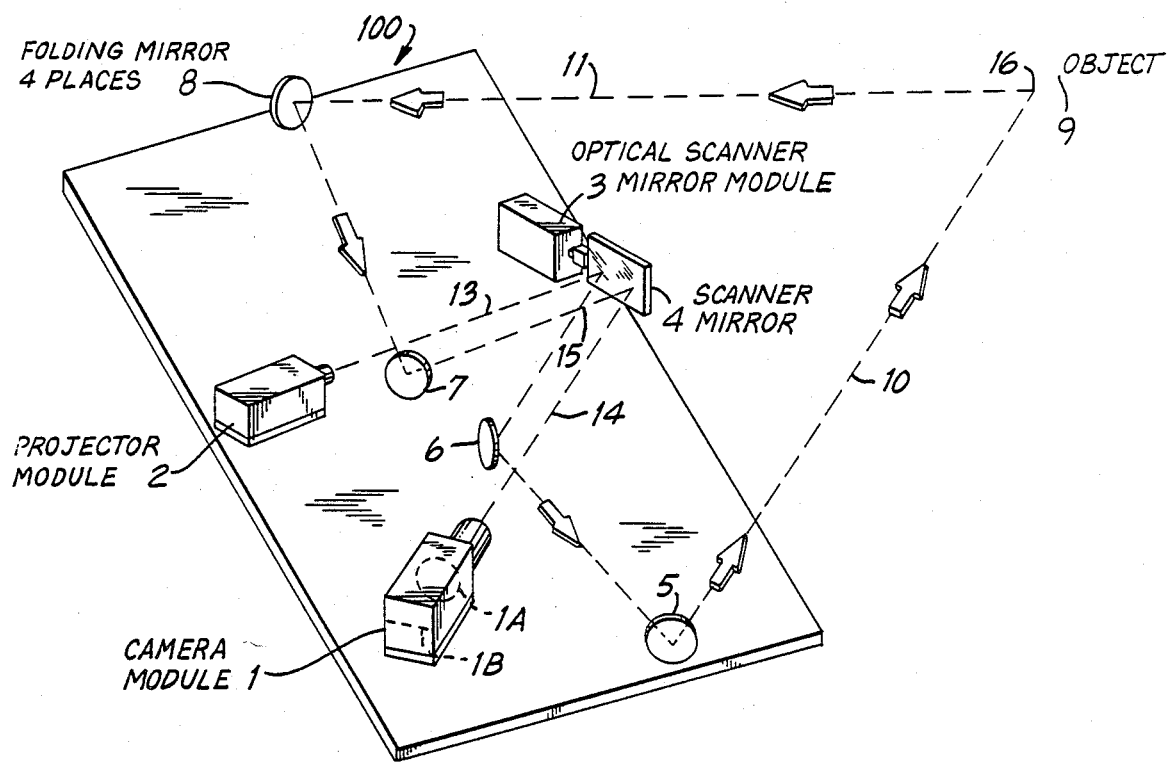
FIG. 1 shows a spot scanning system in accordance with the principles of the present invention.

FIG. 1 shows a spot or point scanning system 100 in accordance with the principles of the present invention. The system 100 can be used as part of a three-dimensional inspection system for measuring the surface of a subject or object 9.

The system 100 includes a conventional projector module 2 comprising a source of illumination such as, for example, a laser diode and the required drive electronics and beam shaping optics to provide an output light beam having the form of a spot or point. The projected spot of light from the module 2 is directed at the object 9 and confronts or intersects a position on the object surface.

A camera module 1 comprising an optical imaging system 1A images the illuminated surface position onto a linear array of light sensing elements 1B. The linear array 1B provides an electrical output signal which is processed to determine the particular line array pixel element receiving the illuminated image. This information is then further processed to assess the three-dimensional location of the surface point.

In accordance with the principles of the present invention, an optical deflector 4 controlled by an optical scanner module 3 is situated in the path of the projection axis of the projector 2. As shown, the deflector 4 comprises a flat mirror. The control module 3, in turn, may include a galvanometer or other mirror positioning mechanism.

The mirror 4 deflects the projection axis 13 so that the spot of light from the projector follows a deflected portion 10 of the projection axis 13. The axis portion 10 is redirected by folding mirrors 6 and 5 so that it is conveyed to the object 9, which is shown in back of control module 3 and scanner mirror 4.

In further accord with the invention, scanner mirror 4 is also situated in the path of the optical axis 14 of the imaging system 1A. Radiant energy reflected from object 9 is thus redirected by a second set of folding mirrors 7, 8 over the deflected portion 11 of the optical axis 14 to mirror 4. The mirror 4, in turn, deflects the redirected light along the axis 14 to the camera module 1.

The projector module 2 and the camera module 1 are arranged so that the portions of the axes 13 and 14 extending from the respective modules to the mirror 4 are coplanar and such that the axis of array 1B is also in this plane. Furthermore, stationary mirrors 5, 6, 7 and 8 are arranged so that the projection and optical axes to the object 9 are at the desired angular relationship required for triangulation.

The mirrors 5, 6, 7 and 8 also maintain the extensions 10 and 11 of the projection and optical axes 13 and 14, deflected by the common scanner mirror 4, in a coplanar relationship. The optical axis and projection axis thus remain coplanar from their respective modules to the object 9. This coplanar relationship results in the illuminated positions on the object 9 being successfully imaged on the sensor array axis for various positions of the mirror 4.

More particularly, for a fixed position of the mirror 4, the camera module 1, the projector module 2 and the mirrors 5–8 are aligned to position the projector and optical axes portions 10 and 11 in a common plane. As the mirror 4 is rotated, the projection axis portion 10 is deflected to illuminate different positions on the object 9. However, as above-noted, the optical axis portion 11 of the imaging system 1A is similarly deflected by the mirror 4 so that the optical axis portion 11 follows and continues to intersect the projection axis portion 10. The coplanar relationship of the axes portions 10 and 11 is thus maintained. This results from the use of the flat single scanner mirror 4 to deflect both axes.

As can be appreciated, the scanner mirror 4, the control module 3, and the mirrors 5, 6 7 and 8 together act to fold the projector-camera plane defined by the portions of the axes 13 and 14 between the mirror 4 and the modules 1 and 2. This folding of the plane results in the portion of the projector-camera plane defined by the axes portions 10 and 11. The mirror 4 and module 3 further act as a plane rotator, rotating the latter projector-camera plane portion, i.e., the portion defined by the axes portions 10 and 11, to provide a light plane in space along the rotational direction perpendicular to the projector-camera plane.

Thus, over the sequence of scanner positions covering a scan cycle, a plane of light is, in effect, formed to confront the object 9. The images of these confrontations are, in turn, conveyed along the optical axis 14 of the camera imaging system 1A to the linear array 1B which generates a sequence of outputs associated with the confrontation profile. These outputs can then be further processed to develop the three-dimensional relationship of the surface points.

As can be appreciated, the sequencing of the scanner mirror 4 to different positions may be made to occur rapidly, since the mirror 4 may be moved continuously. Thus, the data rates achievable with the present system may approach those realizable with projected plane systems.

Figure 2:
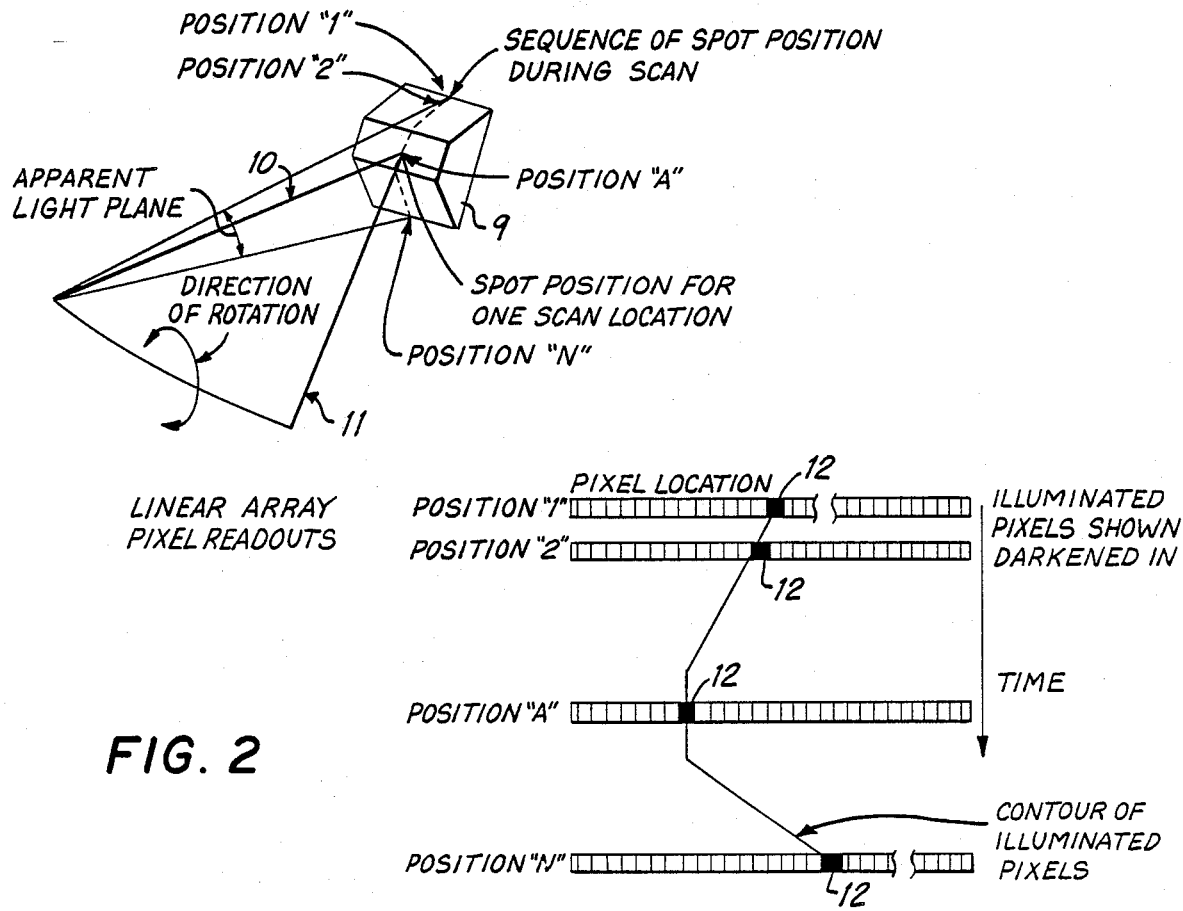
FIG. 2 shows a sequence of scan spot positions along an object surface and corresponding linear sensor array pixel positions illuminated for the different spot positions.

FIG. 2 shows a typical sequence of scanner 4 positions during one scan cycle. As can be seen, the projection axis portion 10 is deflected during the mirror 4 scan and results in the sequence of confrontations at positions 1 through N on the surface of object 9. Each illuminated surface position is imaged by the camera module 1 onto a particular pixel location 12 of the linear array 1B, which is shown as horizontally extending.

In FIG. 2, the array 1B and corresponding illuminated pixel (shown as darkened) are depicted for each of the scan positions 1 through N. The array representations for the various positions are situated one under the other with the array representation for the position 1 being on top. By proceeding vertically downward through the array representations, one sees the relationship of pixel location to scan position, the latter being related to scan time. As can be seen, the contour defined by the illuminated pixels 12 follows the profile formed by the confrontation of the apparent light plane defined by the sequence of spot deflections and the object surface 9.

It is preferable that the scanner mirror 4 be as flat as possible for most desirable operation of the spot scanning system. This flatness requirement is due to the fact that angular surface deviations will cause the position at which the projected spot strikes the surface of the object 9 to deviate by 0.024 inches/milliradian per foot of optical path from the mirror 4 to the surface 9. Similar sensitivity is present on the camera module side. Thus if acoustic, electrical, holographic or other types of deflecting devices are used in place of mirror 4, they must have comparable properties to the mirror. It is further preferable that the mirrors 5, 6 7 and 8 also be flat mirrors.

The size of the scanning mirror and module 3, 4 can advantageously be maintained small by causing the projection axis and optical axis portions 10 and 11 to intersect at a short distance beyond mirror 4. This intersection point normally is desired at greater distances in practice. This has been made possible by use of the folding mirrors 5, 6, 7 and 8 which maps the point 15 of first intersection of these axes portions to the point 16.

It is noted that use of the common deflecting device 4 makes the coplanar alignment of the axes positions 10 and 11 insensitive to the deflecting device position and to any factors which cause the deflector position to drift. It is further noted that the system 100 can be modified to provide for deflection of the spot in multiple directions by using multiple deflectors.

The alignment of mirrors 5, 6, 7 and 8 is important to maintaining the intersection 16 throughout the scan. A convenient method of alignment is to first align the mirrors 5-8 for the horizontal deflection direction and then align each vertical deflection direction. When properly aligned, the point of intersection 16 can be maintained throughout the scan.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, the deflector 4 may take on other forms such as, for example, a multifaceted rotating mirror device, an acoustic device, an electrical device or a holographic device. In such case, the control module 3 would be of a type suitable to control the particular deflecting device being used.

What is claimed is:

1. A system for use in developing information for use in three-dimensional measurement and inspection of an object surface, said system comprising:

means for projecting a spot of light onto an object surface, said projecting means having a projection axis along which said spot of light is projected;

means for sensing the image formed by the confrontation of said spot of projected light with said object surface, said sensing means including: a linear array of sensors, said array defining an array axis; and optical imaging means for conveying said image to said sensor array, said imaging means defining an optical axis for said sensing means, said optical axis intersecting said array axis;

deflector means in the path of said projection axis for deflecting the portion of said projection axis between said deflector means and said object to cause said spot to move to a number of positions on said object surface, said deflector means also being in the path of said optical axis for deflecting the portion of said optical axis between said deflector means and said object to the same degree as said deflector means deflects said projection axis portion, whereby the projection and optical axis portions are maintained coplanar thereby enabling the images of said spot on said surface to be imaged by said imaging means on said sensor array;

said projecting means and said optical imaging means being exclusive of each other and being aimed such that the direction of said optical axis at said optical means is at an angle in relation to the direction of said projection axis at said projection means and such that said optical axis and said projection axis have a first intersection at a point in the vicinity of a said deflector means;

and optical redirection means positioned to redirect the sensing means optical axis and the projection axis after deflection by said deflector means so that said axes have a second intersection in the vicinity of said object surface.

2. A system in accordance with claim 1 wherein:
said deflector means comprises:
a mirror situated in the path of said projection axis and said optical axis; and means for rotating said mirror.

3. A system in accordance with claim 2 wherein:
said mirror is a flat mirror.

4. A system in accordance with claim 3 wherein:
said rotating means comprises a galvanometer.

5. A system in accordance with claim 1 wherein:
said projecting means and sensing means are arranged such that the portion of said projection axis and the portion of said optical axis between said projecting means and said deflector means and said sensing means and said deflector means, respectively, are coplanar with each other and with said array axis;

and said redirection means and deflector means are adjusted at a first position of said deflector means such that said portions of said projection and optical axes between said deflector means and said object are coplanar.

6. A system in accordance with claim 5 wherein:
said deflector means comprises: a first mirror situated in the paths of said projection and optical axes; and means for rotating said first mirror;

and said redirection means comprises:
a second mirror situated forward of said first mirror for receiving the deflected projection axis and redirecting said deflected projection axis;

a third mirror off-set from said second mirror for further redirecting the redirected projection axis beyond said first mirror;

a fourth mirror situated forward of said first mirror for redirecting the deflected optical axis;

and a fifth mirror off-set from said fourth mirror for redirecting the redirected optical axis to beyond said first mirror.

7. A system in accordance with claim 6, wherein: said first mirror is a flat mirror.

8. A system in accordance with claim 5, wherein: said deflector means comprises: a multifaceted rotating mirror device; and means for controlling said device.

9. A system in accordance with claim 5, wherein: said deflector means comprises: a holographic deflecting device; and means for controlling said device.

10. A system in accordance with claim 5, wherein: said deflector means comprises: an acoustic deflecting device; and means for controlling said device.

11. A system in accordance with claim 5, wherein: said deflector means comprises: an electrical deflecting device; and means for controlling said device.

* * * * *